(12) United States Patent
Chen et al.

(10) Patent No.: US 8,931,956 B2
(45) Date of Patent: Jan. 13, 2015

(54) HYDROSTATIC RAIL GUIDE

(71) Applicant: Industrial Technology Research Institute, Hsinchu (TW)

(72) Inventors: Yi-Ming Chen, Taichung (TW); Tzuo-Liang Luo, Taichung (TW); Shao-Ying Hung, New Taipei (TW); Chien-Chih Liao, Taichung (TW); Wei-Juh Lin, Taichung (TW); Shao-Ku Huang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 44 days.

(21) Appl. No.: 13/742,017

(22) Filed: Jan. 15, 2013

(65) Prior Publication Data

US 2014/0112603 A1    Apr. 24, 2014

(30) Foreign Application Priority Data

Oct. 23, 2012 (TW) .............................. 101139137 A

(51) Int. Cl.
| | |
|---|---|
| *F16C 17/00* | (2006.01) |
| *F16C 32/06* | (2006.01) |
| *F16C 29/00* | (2006.01) |
| *F16C 29/02* | (2006.01) |

(52) U.S. Cl.
CPC ............. *F16C 29/005* (2013.01); *F16C 29/025* (2013.01)
USPC ................................................. 384/8; 384/12

(58) Field of Classification Search
USPC ...................... 384/8, 12, 26, 38, 40
See application file for complete search history.

(56) References Cited

U.S. PATENT DOCUMENTS

| | | | |
|---|---|---|---|
| 3,512,848 A | * | 5/1970 | Uhtenwoldt ..................... 384/12 |
| 5,047,629 A | * | 9/1991 | Geist .......................... 250/231.1 |
| 6,012,845 A | | 1/2000 | Lyon |
| 6,120,004 A | | 9/2000 | Park et al. |
| 6,419,394 B1 | | 7/2002 | Kashchenevsky |

(Continued)

FOREIGN PATENT DOCUMENTS

| | | |
|---|---|---|
| CN | 101329156 A | 12/2008 |
| TW | 200925076 A | 6/2009 |

(Continued)

OTHER PUBLICATIONS

Bassani, "Hydrostatic systems supplied through flow dividers", Tribology International, vol. 34, pp. 25-38, 2001.

(Continued)

*Primary Examiner* — James Pilkington
(74) *Attorney, Agent, or Firm* — Rabin & Berdo, P.C.

(57) ABSTRACT

A hydrostatic rail guide includes a guide rail, a guide carriage, a hydrostatic supply device, a measurement device and a controller. The guide carriage is hydrostatically mounted on the guide rail and has a hydrostatic channel filled with oil. The oil keeps the guide carriage and the guide rail at a gap. The hydrostatic supply device is adapted for supplying the oil to the hydrostatic channel and adjusting the pressure of the oil. The measurement device is installed on the guide carriage and adapted for detecting the gap between the guide carriage and the guide rail and for producing a distance signal of the measured gap. The controller is connected to the hydrostatic supply device and the measurement device. The controller is adapted for controlling the hydrostatic supply device, based on the distance signal, in order to adjust the hydrostatic pressure of the oil after being pressurized.

6 Claims, 5 Drawing Sheets

(56) References Cited

U.S. PATENT DOCUMENTS

| | | | |
|---|---|---|---|
| 7,101,080 | B2 | 9/2006 | Kobayashi et al. |
| 7,232,257 | B2 * | 6/2007 | Sai .................... 384/12 |
| 7,311,444 | B2 | 12/2007 | Wasson et al. |
| 8,043,007 | B2 | 10/2011 | Rudy |
| 8,167,491 | B2 | 5/2012 | Bauer et al. |
| 8,550,718 | B2 * | 10/2013 | Huang et al. .......... 384/12 |
| 2007/0286537 | A1 | 12/2007 | Kane et al. |
| 2008/0304772 | A1 * | 12/2008 | Kakutani et al. ....... 384/12 |
| 2010/0290724 | A1 | 11/2010 | Huang et al. |

FOREIGN PATENT DOCUMENTS

| | | |
|---|---|---|
| TW | M390375 U | 10/2010 |
| TW | 201040406 A | 11/2010 |
| TW | M397593 U | 2/2011 |

OTHER PUBLICATIONS

Kang et al., "Design for static stiffness of hydrostatic bearings: single-action variable compensations", Industrial Lubrication and Tribology, vol. 63, pp. 103-118, 2011.

Chen et al., "Dynamic Behaviors Analysis of the Aerostatic Linear Guideway with a Passive Compensator for PCB Drilling Machine", Journal of the Chinese Society of Mechanical Engineers, vol. 30, No. 2, pp. 115-123, 2009.

Rao et al., "An Analytical Approach to Evaluate Dynamic Coefficients and Nonlinear Transient Analysis of a Hydrodynamic Journal Bearing", Tribology Transactions, vol. 43, pp. 109-115, 2000.

Sharma et al., "Influence of recess shape on the performance of a capillary compensated circular thrust pad hydrostatic bearing", Tribology International, vol. 35, pp. 347-356, 2002.

Chen et al., "The influences of orifice restriction and journal eccentricity on the stability of the rigid rotor-hybrid bearing system", Tribology International, vol. 37, pp. 227-234, 2004.

\* cited by examiner

HYDROSTATIC RAIL GUIDE

CROSS-REFERENCE TO RELATED APPLICATIONS

This non-provisional application claims priority under 35 U.S.C. §119(a) on Patent Application No(s). 101139137 filed in Taiwan, R.O.C. on Oct. 23, 2012, the entire contents of which are hereby incorporated by reference.

BACKGROUND

1. Technical Field

The disclosure relates to a hydrostatic rail guide, and more particularly to a hydrostatic rail guide featuring adjustable hydrostatic pressure from a pressurized oil between a guide carriage and a guide rail.

2. Related Art

The hydrostatic rail guide, of prior art, usually has a plurality of throttles and adjustable oil outlets to supply oil to various positions of the guide carriage, in order to keep the guide rail and guide carriage at a gap from each other. When the guide carriage tilts, different hydrostatic pressures from the pressurized oil occur at different parts of the guide carriage. The more the guide carriage sinks, the larger the hydrostatic pressure from the pressurized oil becomes, triggering the throttle to supply more oil and the oil outlets to narrow its gap. As a result, the increase of the pressurized oil lifts up the portion of the guide carriage that sank previously.

However, without the tilt of the guide carriage, the throttles and the oil outlets are not activated to adjust the oil. Once the tilted guide carriage is balanced at a horizontal position, it is still unable to confirm if the guide carriage has returned to its original level. If unsure of the level that the guide carriage returns to, deviations and errors may occur during processing.

BRIEF DESCRIPTION OF THE DRAWINGS

The disclosure will become more fully understood from the detailed description given herein below by way of example with reference to the accompanying drawings, and thus does not limit the disclosure, and wherein.

SUMMARY

Figure 1A:
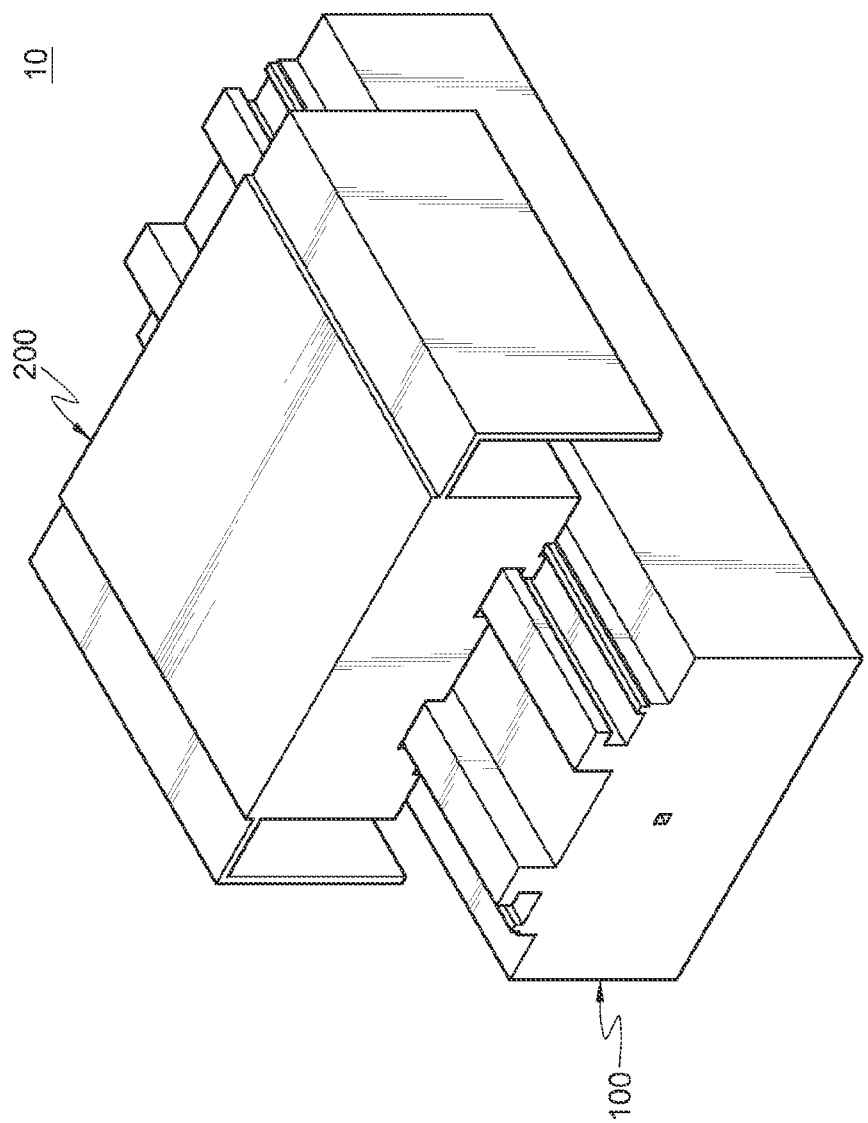
FIG. 1A is a perspective view of a hydrostatic rail guide according to an embodiment of the disclosure.

A hydrostatic rail guide comprises a guide rail, a guide carriage, a hydrostatic supply device, a measurement device and a controller. The guide carriage is hydrostatically mounted on the guide rail and has a hydrostatic channel filled with oil. The oil keeps the guide carriage and the guide rail at a gap. The hydrostatic supply device is adapted for supplying the oil to the hydrostatic channel and adjusting the pressure of the oil. The measurement device is installed on the guide carriage and adapted for detecting the gap between the guide carriage and the guide rail and for producing a distance signal of the measured gap. The controller is connected to the hydrostatic supply device and the measurement device. The controller is adapted for controlling the hydrostatic supply device, based on the distance signal, in order to adjust the hydrostatic pressure of the oil after the oil is pressurized.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
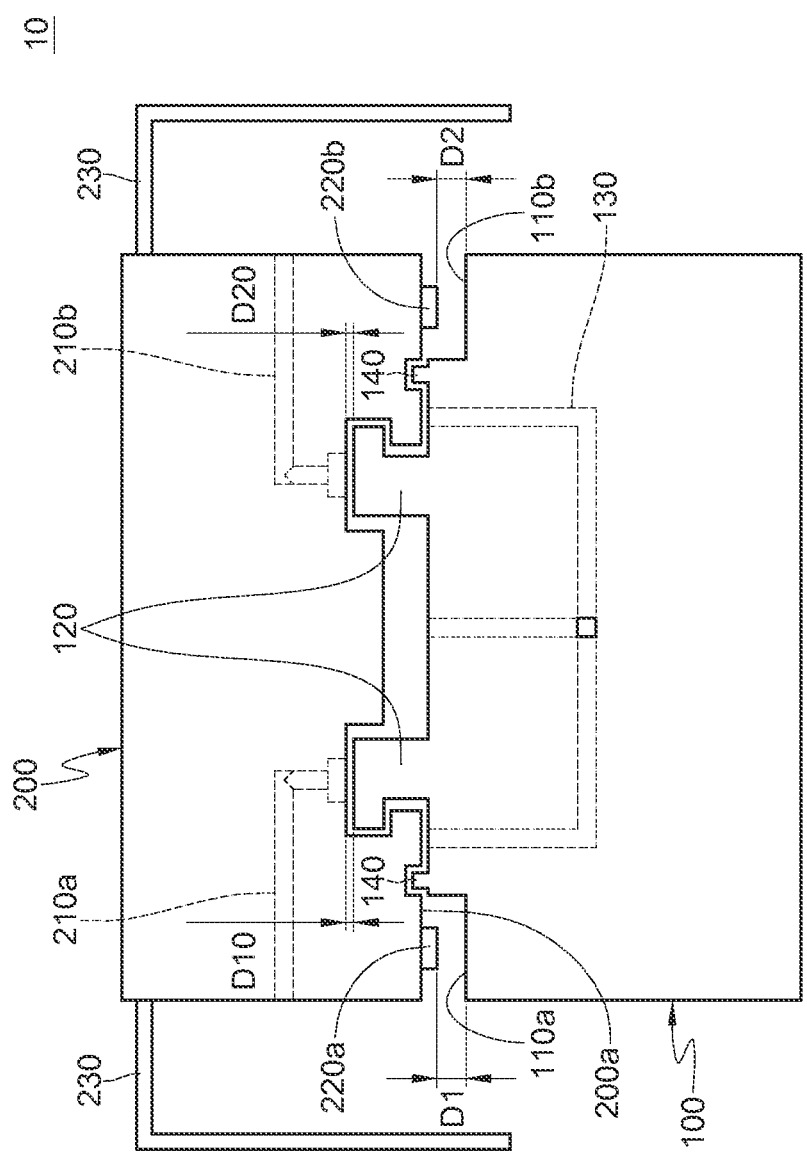
FIG. 1B is a sectional view of the hydrostatic rail guide in FIG. 1.
Figure 1C:
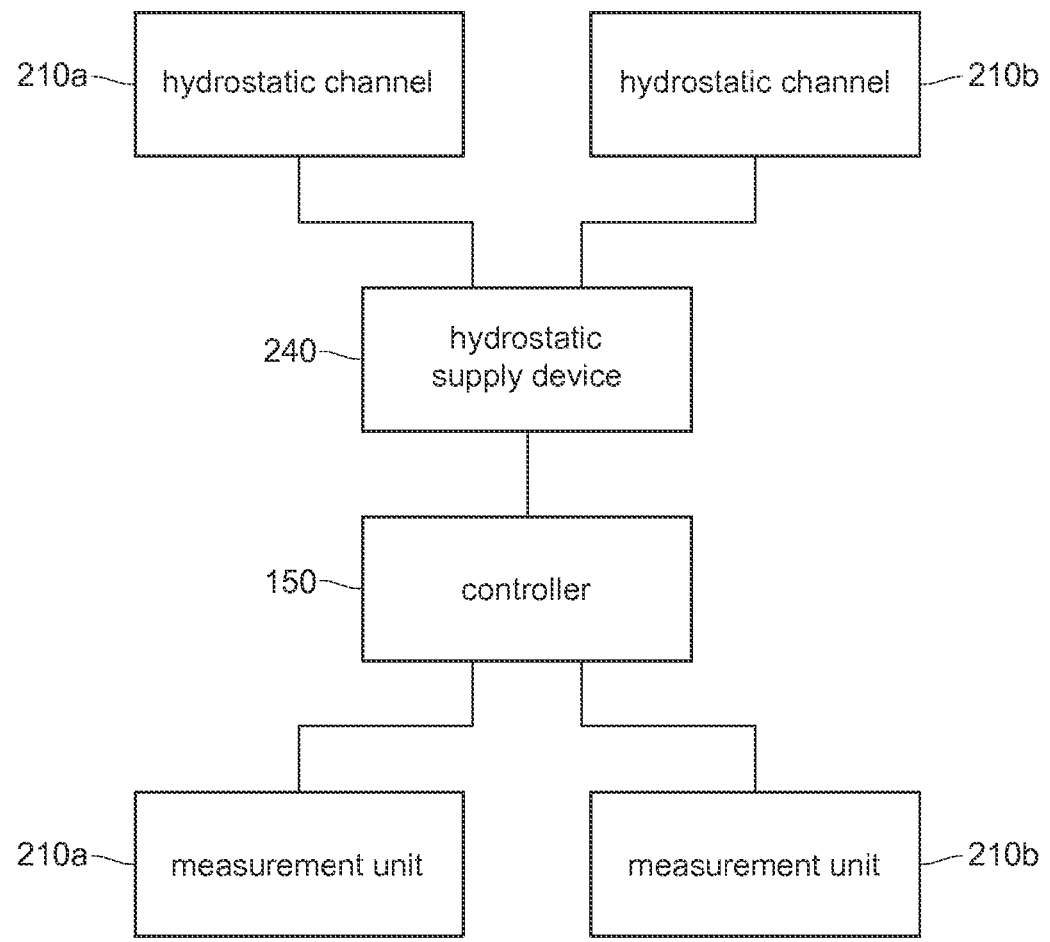
FIG. 1C is a control logic diagram of the hydrostatic rail guide in FIG. 1.

With reference to FIG. 1, which is a perspective view of a hydrostatic rail guide 10 according to an embodiment of the disclosure. The hydrostatic rail guide 10 described in the embodiment of the disclosure comprises a guide rail 100 and a guide carriage 200. The guide carriage 200 is hydrostatically mounted on the guide rail 100 and is adapted to move longitudinally with respect to the guide rail 100. The guide carriage 200 can be loaded with workpieces for processing by means of the hydrostatic rail guide 10. With reference to FIGS. 1B and 1C, FIG. 1B is a sectional view of the hydrostatic rail guide in FIG. 1 and FIG. 1C is a control logic diagram of the hydrostatic rail guide in FIG. 1. The hydrostatic rail guide 10 also comprises a hydrostatic supply device 240, a plurality of measurement units 220a and 220b, and a controller 150.

The guide rail 100 includes a plurality of datum surfaces 110a and 110b, a pair of rails 120, a drainage 130, and a plurality of extrusions 140. Each of the datum surfaces 110a and 110b is located oppositely on outer sides of the opposite rails 120 with each of the extrusions 140 being located in between one of the rails 120 and the datum surface 110a as well as the other rail 120 and the datum surface 110b respectively. Both the datum surfaces 110a and 110b have a light reflection rate of more than 70 percent.

The guide carriage 200 is hydrostatically mounted on the rails 120 of the guide rail 100, and is movable in a longitudinal direction of the rails 120. The guide carriage 200 comprises a plurality of hydrostatic channels 210a and 210b filled with oil and with respective openings facing the rails 120 to supply the oil. The oil in the hydrostatic channels 210a and 210b keeps the guide carriage 200 and the guide rail 100 gapped, at a gap D10 and at a gap D20, on both sides thereof. The drainage 130 is connected to the gaps D10 and D20. The extrusions 140 of the guide rail 100 is adapted to prevent the oil from flowing to the datum surfaces 110a and 110b.

The hydrostatic supply device 240 is connected to and supplies the oil to the hydrostatic channels 210a and 210b, and adjusts the hydrostatic pressure from the pressurized oil. The gaps D10 and D20 between the guide carriage 200 and the guide rail 100 may be altered by the hydrostatic pressure from the pressurized oil in the gaps D10 and D20. The distances of the gaps D10 and D20 increase when the hydrostatic pressure of the pressurized oil therein increases. On the other hand, the distances of the gaps D10 and D20 reduce when the hydrostatic pressure of the pressurized oil decreases.

The measurement units 220a and 220b, that compose a measurement device consisting of light sensors, are installed on the guide carriage 200 as well as facing the datum surfaces 110a and 110b. According to the light reflected by the datum surfaces 110a and 110b, the measurement units 220a and 220b can calculate distance and offset angle. In detail, the measurement unit 220a can measure the gap D1 between itself and the datum surface 110a, thus to calculate the gap D10; the measurement unit 220b can measure the gap D2 between itself and the datum surface 110b, thus to calculate the gap D20. The measurement units 220a and 220b can produce a distance signal based on the measured data of gaps D1 and D2. The guide carriage 200 has a bottom surface 200a opposite to the guide rail 100. The measurement units 220a and 220b are installed on the bottom surface 200a and protected thereby from jetted particles and process solutions generated during the processing work conducted on the guide carriage 200. The hydrostatic rail guide 10 also comprises a cover 230 which is attached to the guide carriage 200 and covers the measurement units 220a and 220b to prevent the jetted particles and process solutions generated during the processing work, from reaching the measurement units 220a and 220b. In addition, the hydrostatic rail guide 10a may comprise a stretchable cover (not displayed in the drawing) attached to the guide carriage 200 along the longitudinal direction of the rail 120, i.e. the perpendicular direction to or from the sheet of paper with FIG. 1B printed, which may further protect the measurement units of 220a and 220b from damage.

The controller 150 is connected to the hydrostatic supply device 240 and the measurement units 220a and 220b and, according to the distance signal, is adapted for controlling the hydrostatic supply device 240 to supply the pressurized oil to the hydrostatic chancels 210a and 210b.

When the weight of the guide carriage 200 and the workpiece thereon are varied, the gaps D10 and D20 between the guard carriage 200 and the guide rail 100 alter accordingly, leading to changes of the gaps D1 and D2 between the measurement units 220a and 220b and the datum surfaces 110a and 110b respectively.

Neither the workpiece is on the guide carriage nor the center of gravity and the weight of the workpiece on the guide carriage change, the controller 150 can instruct the hydrostatic supply device 240 to adjust the hydrostatic pressure of the pressurized oil supplied to the hydrostatic channels 210a and 210b. Moreover, the measurement unit 220a, that detects the gap D1 between itself and the datum surface 110a, and the measurement unit 220b, that detects the gap D2 between itself and the datum surface 110b, both transmit the distance signals to the controller 150. The controller 150 then applies the distance signals to control the hydrostatic supply device 240 to adjust the hydrostatic pressure of the pressurized oil to equate the gaps of D10 and D20, resulting in making the gaps D1 and D2 to be equal to each other. The pressurized oil discharged from the hydrostatic channels 210a and 210b is received by the drainage 130 to be carried away from the space between the guide carriage 200 and the guide rail 100 and retrieved back to the hydrostatic supply device 240 for recycle.

When the guide carriage 200 needs to be elevated, the controller 150 operates the hydrostatic supply device 240 to increase the hydrostatic pressure of the pressurized oil, which lifts up the weight of the guide carriage 200. Therefore, the gaps D10 and D20 between the guide carriage 200 and the guide rail 100 are increased, and consequently leads to increase the gaps D1 and D2 until the gaps D1 and D2 are reached to a predetermined value. When the guide carriage 200 is loaded with the workpiece whose gravity causes the guide carriage 200 to sink, reduced distances of the gaps D1 and D2 are detected by the measurement units 220a and 220b by sending the distance signals to the controller 150. Upon receipt of the distance signal, the controller 150 operates the hydrostatic supply device 240 to increase the pressurized oil in order to lift up the weight of the guide carriage 200 and the workpiece as well as to increase the gaps D10 and D20 between the guide carriage 200 and the guide rail 100, until the gaps D1 and D2 are returned to the predetermined value. This operation ensures the accurate level of the guide carriage 200 and avoids processing errors.

When the workpiece is removed or the weight of the guide carriage 200 reduces, the existing hydrostatic pressure of the pressurized oil becomes excess for supporting the weight of the guide carriage 200 alone, thus lifting up the guide carriage 200, causing the gaps of D10 and D20 as well as the gaps of D1 and D2 to widen further. The controller 150 then, according to the distance signal produced by the measurement units 220a and 220b from monitoring the increased values of the gaps D1 and D2, instructs the hydrostatic supply device 240 to reduce the hydrostatic pressure of the pressurized oil, thus lessening the gaps D10 and D20 between the guide carriage 200 and the guide rail 100, until the gaps D1 and D2 return to the predetermined value. Therefore, this operation ensures the accurate level of the guide carriage 200 and avoids processing errors.

When the center of gravity of the workpiece is not placed on the centerline of the guide carriage 200 or the workpiece on the guide carriage 200 shifts during the process causing the guide carriage 200 to tilt, the gaps D10 and D20 between the guide carriage 200 and guide rail 100, as well as the gaps of D1 and D2, become uneven. When both the gaps D1 and D2, measured by the measurement units 220a and 220b respectively, are shorter than the predetermined value, and the gap D1 is smaller than the gap D2, it shows that both the right and left sides of the guide carriage 200 sank as well as the left side has sunk more than the right side. At this time, the controller 150 is configured to instruct the hydrostatic supply device 240 to increase hydrostatic pressure by providing further pressurized oil to the hydrostatic channels 210a and 210b according to the distances of the gaps D1 and D2. The increased of the hydrostatic pressure of the pressurized oil to the hydrostatic channel 210a is greater than that to the hydrostatic channel 210b until both the gaps D1 and D2 return to the predetermined value. Therefore, the guide carriage 200 can maintain its balanced level. This operation ensures the accurate level of the guide carriage 200 and avoids processing errors.

When the gap D1, measured by the measurement unit 220a, is shorter than the predetermined value, yet the gap D2, measured by the measurement unit 220b, is longer than the predetermined value, it shows that the left side of the guide carriage 200 has sunk, while its right side has ascended. The controller 150 is configured to instruct the hydrostatic supply device 240 to adjust the hydrostatic pressure of the pressurized oil to the hydrostatic channels 210a and 210b according to the distances of the gaps D1 and D2. The controller instructs the hydrostatic supply device 240 to increase the hydrostatic pressure of the pressurized oil to the hydrostatic channel 210a and, at the same time, to decrease the hydrostatic pressure of the pressurized oil to the hydrostatic channel 210b until the gaps D1 and D2 return to the predetermined value. Therefore, the guide carriage 200 can maintain its balanced level. This operation ensures the accurate level of the guide carriage 200 and avoids processing errors.

When both the gaps D1 and D2, measured by the measurement units 220a and 220b respectively, are longer than the predetermined value, and the gap D1 is smaller than the gap D2, it shows that both the right and left sides of the guide carriage 200 have ascended and the right side has elevated more than the left side. The controller 150 is adapted to instruct the hydrostatic supply device 240 to reduce the hydrostatic pressure of the pressurized oil flowing to the hydrostatic channels 210a and 210b according to the distances of the gaps D1 and D2. The reduce of the hydrostatic pressure in the hydrostatic channel 210a is smaller than that in the hydrostatic chancel 210b, until both the gaps D1 and D2 return to the predetermined value. Therefore, the guide carriage 200 can maintain its balanced level. This operation ensures the accurate level of the guide carriage 200 and avoids processing errors.

The above-mentioned embodiments, having the gap D1 smaller than the gap D2, are for exemplary purpose only. In other embodiments, if the gap D1 is larger than the gap D2, it can be implemented with similar operations with the condition of the left and right sides reversed. Therefore, the explanation will not be repeated here.

When the measurement units 220a and 220b detect that the values of the gaps D1 and D2 are the same as the predetermined value, and an offset angle occurs, it shows that the body of the guide carriage 200 is bent. When such offset angles, detected by the measurement units 220a and 220b, extend from the perpendicular line toward the centerline of the guide carriage 200, it shows that the center of the guide carriage 200 bends upward away from the guide rail 100 and both sides of the guide carriage 200 descend towards the guide rail 100. On the other hand, when such offset angles, detected by the measurement units 220a and 220b, extend from the perpendicular line toward outer sides of the guide carriage 200, it shows that the center of the guide carriage 200 bends inward toward the guide rail 100 and its both sides tilt. The controller 150 can measure the bending of the guide carriage 200 based on the offset angles, detected by the measurement units 220a and 220b and the geometric data of the guide carriage 200. In this embodiment, when a reprocessing tool is at the descended area of the guide carriage 200, the controller 150 can instruct the hydrostatic supply device 240 to increase the hydrostatic pressure of the pressurized oil supplied to the hydrostatic channels 210a and 210b to compensate for the deviation of the guide carriage 200. In another embodiment, when the reprocessing tool is at the elevated area of the guide carriage 200, the controller 150 can instruct the hydrostatic supply device 240 to reduce the hydrostatic pressure of the pressurized oil supplied to the hydrostatic channels 210a and 210b to adjust the deviation and lower the guide carriage 200 accordingly.

Furthermore, when the controller 150 calculates that the center part of the guide carriage 200 is bent inward because of its own weight by the measurement units 220a and 220b, operators can measure the recess using a depth micrometer or a digital depth micrometer and input the measurement to the controller 150 in order to reset the operation of the controller 150 for commanding the hydrostatic supply device 240 to increase the hydrostatic pressure of the pressurized oil supplied to the hydrostatic channels 210a and 210b and to elevate the guide carriage 200 to the exact scale that compensates the recess.

Figure 2:
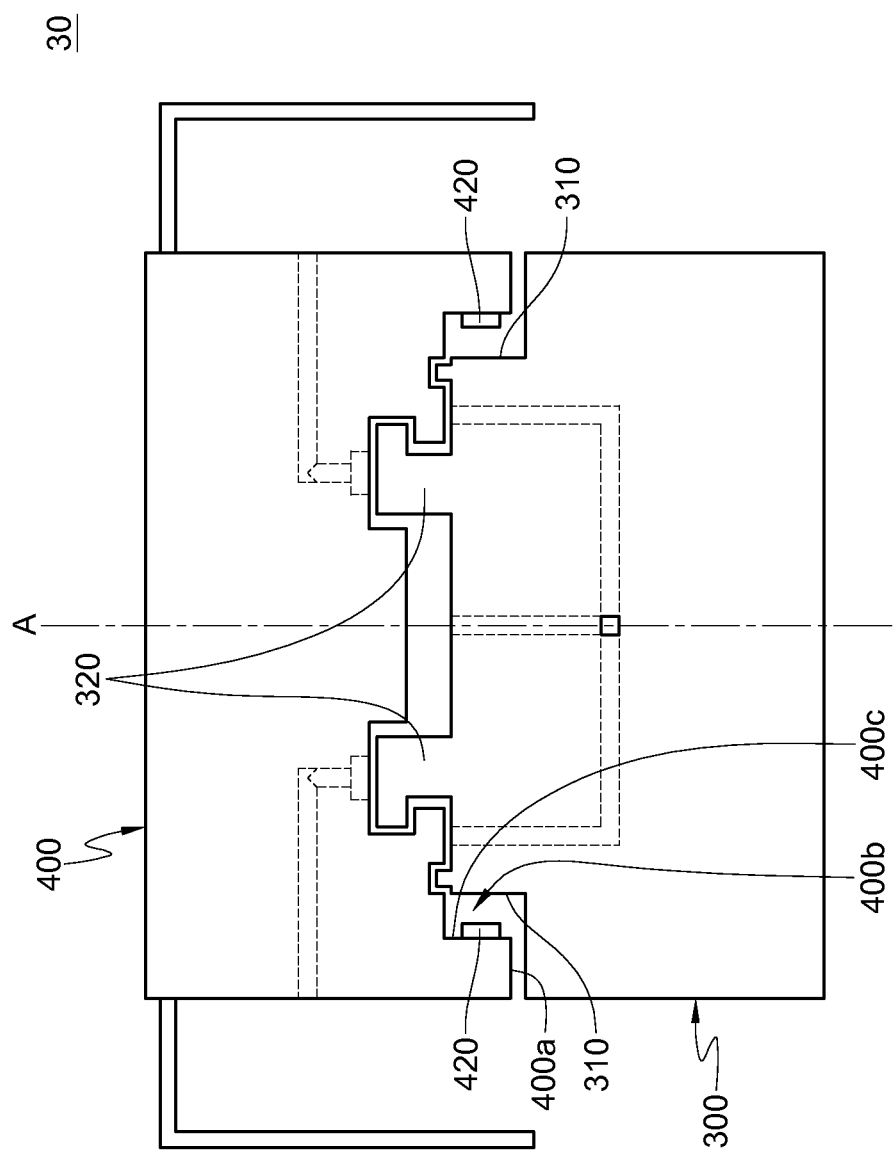
FIG. 2 is a sectional view of a hydrostatic rail guide according to another embodiment of the disclosure.

With reference to FIG. 2, FIG. 2 is a sectional view of a hydrostatic rail guide 30 having a vertical central axis A according to another embodiment of the disclosure. The design of the hydrostatic rail guide 30 is similar to that of the hydrostatic rail guide 10 illustrated in FIG. 1B, but with the datum surface 310 of the guide rail 300 facing oppositely away from the rail 320. The guide carriage 400 has an outer bottom surface 400a that forms a recess 400b having a sidewall 400c where a plurality of measurement units 420 of the measurement device are installed, they face toward the rail 320 as well as face the datum surfaces 310 respectively. When the guide carriage 400 tilts, the gaps between the measurement units 420 and the datum surfaces 310 change as well as the offset angles of the measurement units 420 will also change. The datum surfaces 310 can includes a plurality of scales (namely, graduation). The measurement units 420 may determine its relative height from the guide rail 300 according to the plurality of scales. As shown in FIG. 1C, the controller 150 can adjust or correct the tilt, the decline and the horizontal level of the guide carriage 400 according to the detection result of the gap, the offset angle and the height by the measurement units 420.

Figure 3:
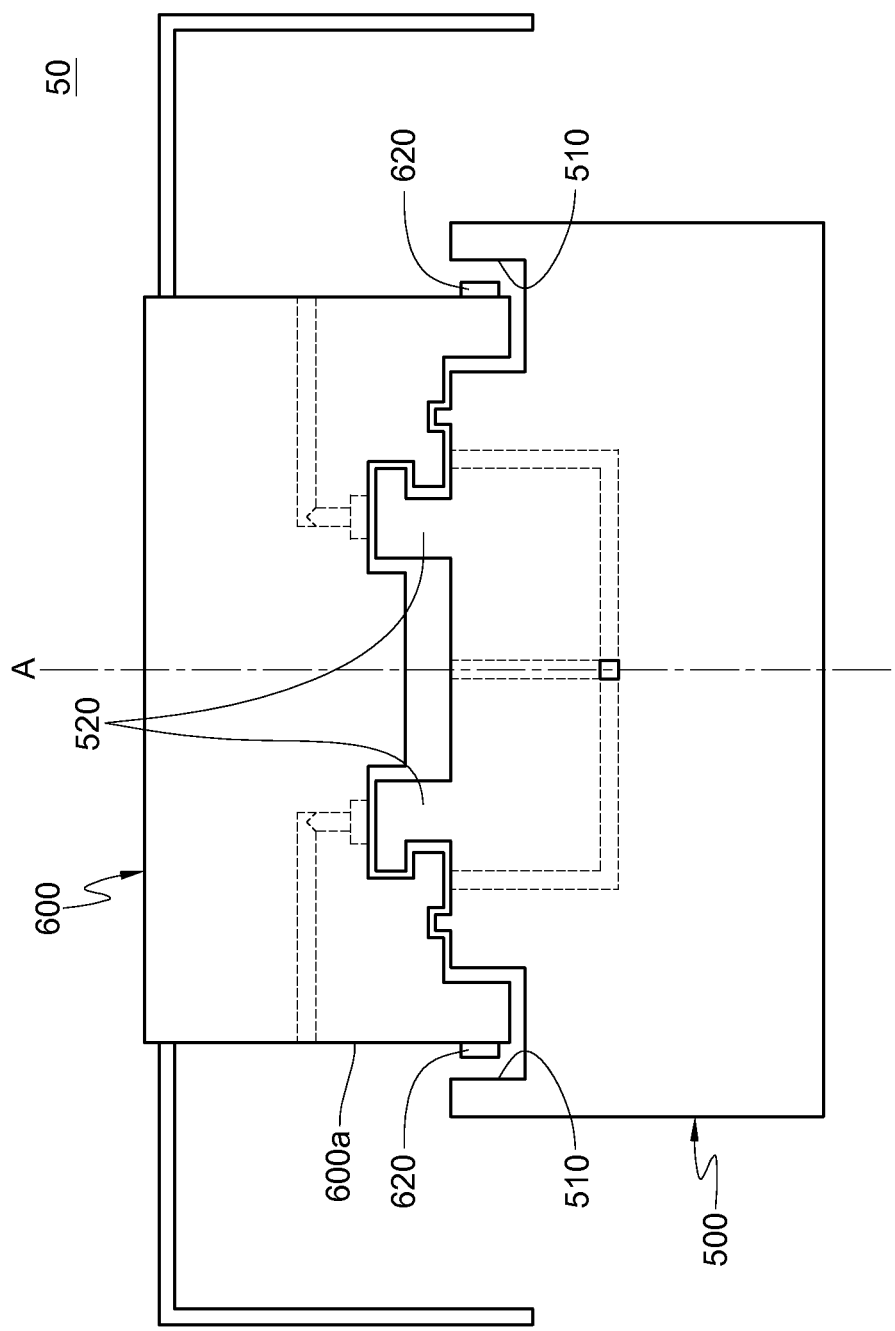
FIG. 3 is a sectional view of a hydrostatic rail guide according to yet another embodiment of the disclosure.

Please refer to FIG. 3, which is a sectional view of a hydrostatic rail guide 50 having a vertical central axis A according to yet another embodiment of the disclosure. The design of the hydrostatic rail guide 50 is similar to that of the hydrostatic rail guide 30 illustrated in FIG. 2, but with the datum surfaces 510 of the guide rail 500 facing the direction toward the rail 520 as well as a plurality of measurement units 620 of the measurement device, installed on the sidewall 600a of the guide carriage, facing the datum surfaces 510 and oppositely away from the rail 520 respectively. When the guide carriage 600 tilts, the gaps between the measurement units 620 and the datum surfaces 510 change as well as the offset angles of the measurement units 620 will also change. The datum surfaces 510 include a plurality of scales (graduation). The measurement units 620 may determine its relative height from the guide rail 500. As shown in FIG. 1C, the controller 150 can adjust or correct the tilt, the decline and the horizontal level of the guide carriage 500 according to the detection result of the gap, the offset angle and the height by the measurement units 620.

To sum up, the hydrostatic rail guide according to the disclosure can control the hydrostatic supply device to adjust the hydrostatic pressure of the pressurized oil supplied to the hydrostatic channels, based on the measured gaps between the guide carriage and the guide rail, as well as automatically adjust the gap between the guide carriage and the guide rail according to the change of the hydrostatic pressure of the pressurized oil. Thus, the hydrostatic rail guide of the disclosure can maintain the guide carriage to incline at a certain degree or at a certain horizontal level during processing without deviations. The measurement units of the measurement device are installed on the bottom surface of the guide carriage and face the datum surface of the guide rail such that the measurement units are protected by the guide carriage, the cover installed on the guide carriage and the stretchable covers from the jetted particles and process solutions during the processing conducted on the guide carriage. The design to have the measurement units installed on the guide carriage instead of the guide rail or the facility can reduce the quantity of the measurement units that are needed to accomplish the same operation described in the embodiments of this disclosure. Therefore, the disclosure offers a hydrostatic rail guide that utilizes a minimal number of measurement units to perform the measurement of the gaps between the guide carriage and the guide rail.

What is claimed is:
1. A hydrostatic rail guide, comprising:
a guide rail including a drainage, a plurality of datum surfaces, a pair of rails and a vertical central axis, and the plurality of datum surfaces being located on an outer side of the pair of rails;
a guide carriage hydrostatically mounted on the guide rail, the guide carriage having a hydrostatic channel filled with oil, the oil being adapted for keeping the guide carriage and the guide rail at a gap from each other, the vertical central axis penetrating the guide carriage, and the drainage being connected to the gap, the guide carriage being hydrostatically mounted on the pair of rails and moveable in a longitudinal direction of the pair of rails;

a hydrostatic supply device adapted for supplying the oil to the hydrostatic channel and adjusting the pressure of the oil;

a measurement device installed on the guide carriage and including a plurality of measurement units opposite to the plurality of datum surfaces, the measurement device being adapted for detecting the gap between the guide carriage and the guide rail, and for producing a distance signal of the gap which is measured, and the plurality of measurement units is adapted for performing detection;

a controller connected to the hydrostatic supply device and the measurement device, and the controller being adapted for controlling the hydrostatic supply device, based on the distance signal, in order to adjust the hydrostatic pressure of the oil after being pressurized; and wherein the plurality of datum surfaces face the pair of rails and have a normal line substantially perpendicular to the vertical central axis, the plurality of measurement units installed on a sidewall of the guide carriage face toward the plurality of datum surfaces and oppositely away from the pair of rails, and a distance between the datum surface and the vertical central axis is greater than a distance between the measurement unit and the vertical central axis.

2. The hydrostatic rail guide according to claim 1, further comprising a cover attached to the guide carriage and covering the measurement device.

3. The hydrostatic rail guide according to claim 1, wherein the measurement device is a light sensing device.

4. The hydrostatic rail guide according to claim 3, wherein each of the plurality of the datum surfaces has a light reflection rate of more than 70 percent.

5. The hydrostatic rail guide according to claim 1, wherein the plurality of datum surfaces have a plurality of scales.

6. A hydrostatic rail guide, comprising:

a guide rail including a drainage, a plurality of datum surfaces, a pair of rails, an extrusion located between each rail and a datum surface, and a vertical central axis, the plurality of datum surfaces being located on an outer side of the pair of rails;

a guide carriage hydrostatically mounted on the guide rail, the guide carriage having a hydrostatic channel filled with oil, the oil being adapted for keeping the guide carriage and the guide rail at a gap from each other, the vertical central axis penetrating the guide carriage, and the drainage being connected to the gap the guide carriage being hydrostatically mounted on and being moveable in a longitudinal direction of the pair of rails;

a hydrostatic supply device adapted for supplying the oil to the hydrostatic channel and adjusting the pressure of the oil;

a measurement device installed on the guide carriage and including a plurality of measurement units opposite to the plurality of datum surfaces, the measurement device being adapted for detecting the gap between the guide carriage and the guide rail, and for producing a distance signal of the gap which is measured, and the plurality of measurement units is adapted for performing detection;

a controller connected to the hydrostatic supply device and the measurement device, and the controller being adapted for controlling the hydrostatic supply device based on the distance signal, in order to adjust the hydrostatic pressure of the oil after being pressurized; and wherein the plurality of datum surfaces face oppositely away from the pair of rails and having a normal line substantially perpendicular to the vertical central axis; the guide carriage has a bottom surface facing the guide rail, the bottom surface forms a recess having a sidewall where the plurality of measurement units are installed, the plurality of measurement units face the pair of rails and the plurality of datum surfaces, and a distance between the datum surface and the vertical central axis is less than a distance between the measurement unit and the vertical central axis.

* * * * *